US005875107A

United States Patent [19]

[11] Patent Number: 5,875,107

Nagai et al.

[45] Date of Patent: Feb. 23, 1999

[54] INVERTER APPARATUS

[75] Inventors: Satoshi Nagai; Kenichiro Nishi; Takeshi Arai, all of Tokyo, Japan

[73] Assignee: Mitsubishi Denki Kabushiki Kaisha, Tokyo, Japan

[21] Appl. No.: 925,747

[22] Filed: Sep. 9, 1997

[30] Foreign Application Priority Data

Dec. 5, 1996 [JP] Japan .................................... 8-325311

[51] Int. Cl.[6] ........................ H02M 7/537; H02M 7/538; H02M 7/00

[52] U.S. Cl. .......................... 363/131; 363/132; 363/124; 363/37

[58] Field of Search .................................... 363/131, 132, 363/17, 34, 37, 39, 98, 124

[56] References Cited

U.S. PATENT DOCUMENTS 5,274,540 12/1993 Maehara .................................... 363/37

FOREIGN PATENT DOCUMENTS 2-211065 8/1990 Japan .
4-193064 7/1992 Japan .

*Primary Examiner*—Peter S. Wong
*Assistant Examiner*—Rajnikant B. Patel
*Attorney, Agent, or Firm*—Burns, Doane, Swecker & Mathis, LLP

[57] ABSTRACT

After a DC voltage outputted from a rectifying circuit 2 is smoothed by a smoothing capacitor 3, transistors 4 and 5 are turned ON/OFF so as to convert the smoothed DC voltage into high frequency power. This high frequency power is supplied via a second resonant circuit 22 to a load circuit 23 and a first resonant circuit 17, and a high frequency voltage is superimposed on the output of the rectifying circuit 2 from the first resonant circuit 17.

12 Claims, 11 Drawing Sheets

VOLTAGE WAVEFORM OF COMMERCIAL POWER SUPPLY 1

TRANSISTOR 4

TRANSISTOR 5

VOLTAGE WAVEFORM OF CAPACITOR 2

OUTPUT VOLTAGE WAVEFORM OF RECTIFYING CIRCUIT 2

OUTPUT CURRENT WAVEFORM OF RECTIFYING CIRCUIT 2

CURRENT WAVEFORM OF COMMERCIAL POWER SUPPLY 1

FIG. 5A
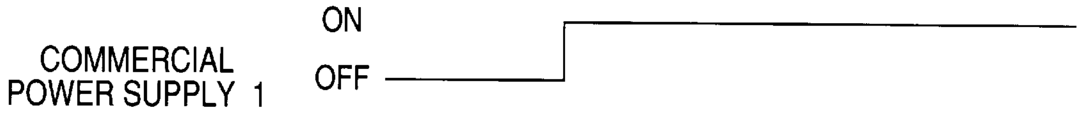
FIG. 5B
FIG. 5C
FIG. 5D
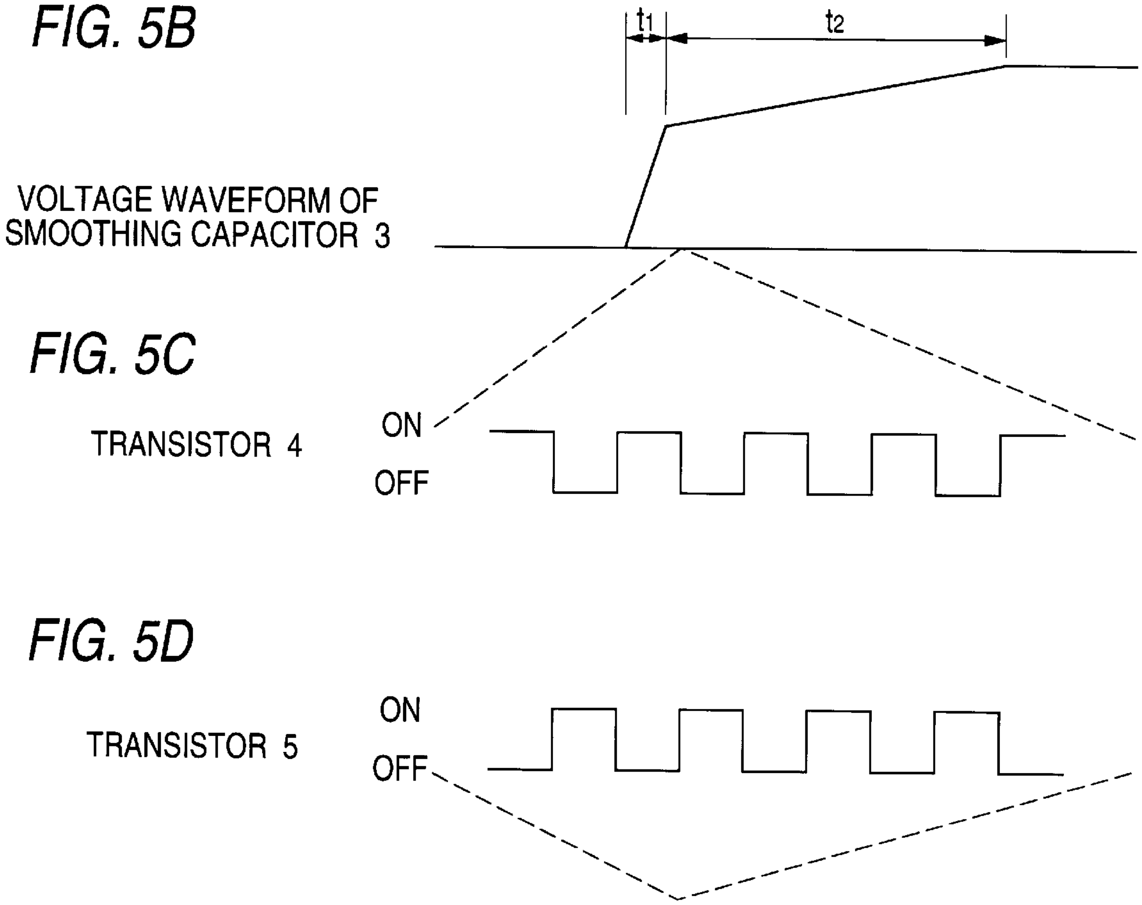
FIG. 5E
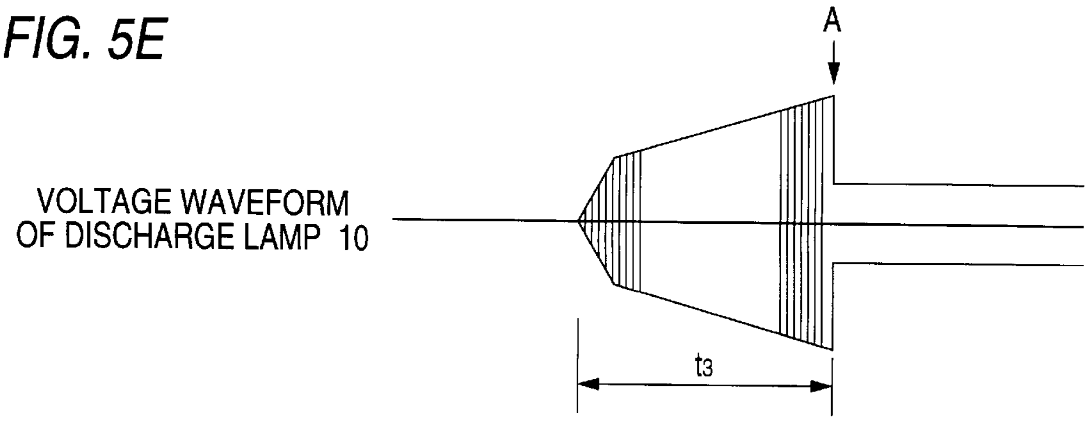

INVERTER APPARATUS

BACKGROUND OF THE INVENTION

1. Field of the Invention

This invention is related to an inverter apparatus in which a commercial AC power supply is converted into a DC voltage, and this DC voltage is switched by turning ON/OFF switching means, so that high frequency power is supplied to a load.

2. Description of the Related Art

FIG. 11 is a circuit diagram of a conventional inverter apparatus conceivable from, for instance, Japanese Patent Disclosure No. Hei-2-211065 and Japanese Patent Disclosure No. Hei-4-193064. FIGS. 12A and 12B represent operation waveform diagrams of this circuit.

In FIG. 11, after a DC voltage obtained by rectifying a commercial power supply 1 by way of a rectifying circuit 2 is smoothed by a smoothing capacitor 3, this DC voltage is applied to series-connected transistors 4 and 5. The transistors 4 and 5 are controlled by a control circuit 6 in such a manner that these transistors are alternately turned ON/OFF in a high speed, so that high frequency power is supplied from a connection point between the transistors 4 and 5 to a load circuit 7.

In this example, the load circuit 7 is arranged by, for instance, a coupling capacitor 8, a current limiting coil 9, a discharge lamp 10, and a capacitor 11 connected in parallel to the discharge lamp 10. Filaments 101 and 102 are built in both ends of the discharge lamp 10, and the high frequency power causes a current to flow through the discharge lamp 10 and also to flow via a capacitor 11 through the filaments 101 and 102, so that these filaments 101 and 102 are heated.

In FIGS. 12A and 12B, FIG. 12A represents an input voltage waveform from the commercial power supply 1, and FIG. 12B indicates an input current waveform from the commercial power supply 1.

Operations will now be made.

In such a conventional inverter apparatus, when the transistor 4 is brought into the ON state and the transistor 5 is brought into the OFF state, the current will flow from the smoothing capacitor 3 via the transistor 4 to the load circuit 7 along one direction, and this current charges the coupling capacitor 8 provided in the load circuit 7.

Also, when the transistor 4 is brought into the OFF state and the transistor 5 is brought into the ON state, the charges of the coupling capacitor 8 are discharged via the transistor 5, and then the current will flow into the load circuit 7 along a direction opposite to the above-described direction.

As a result, the transistors 4 and 5 are alternately turned ON/OFF at a high speed by the control circuit 6, so that the high frequency power is supplied to the load, namely the discharge lamp 10.

However, as shown in FIGS. 12A and 12B, in the conventional circuit, when the power supply voltage of the commercial power supply 1 is approximated to the peak value, the input current may flow. When the power supply voltage is not substantially equal to the peak value, no input current will flow.

As a consequence, the waveform of the input current becomes a pulsatory waveform, and the peak value thereof is also increased.

In the conventional inverter apparatus with the above-described circuit arrangement, since the inverter apparatus is of the capacitor input type, the waveform of the input current becomes the pulsatory peak shape. There are problems that the power factor is lowered and the harmonic disturbance will occur.

SUMMARY OF THE INVENTION

The present invention has been made to solve the above-described problems, and therefore an object of the invention is to obtain an inverter apparatus capable of reducing input current distortion, having a high power factor, and also having less harmonic waves of a power supply.

In an inverter apparatus, according to the present invention, equipped with a rectifying circuit for rectifying a commercial power supply in a full-waveform mode; a smoothing capacitor for smoothing an output of this rectifying circuit; first switching means and second switching means, which are provided between output terminals of this smoothing capacitor, are series-connected to each other, and are alternately turned ON/OFF; and a control circuit for turning ON/OFF the first switching means and the second switching means so as to convert a voltage of the smoothing capacitor into high frequency power, the high frequency power being supplied to a load;

the inverter apparatus is comprised of:

- a first resonant circuit constructed of a first coil and a first capacitor, and connected to an output of the rectifying circuit;
- a first diode for separating the rectifying circuit from the smoothing capacitor;
- a second diode connected in parallel to a series circuit constructed of the coil and the separating diode;
- a third diode connected in parallel to the first capacitor;
- a second resonant circuit constructed of a second coil and a second capacitor, and connected to a high frequency voltage output unit from the control circuit; and
- a load circuit connected between the first resonant circuit and the second resonant circuit.

Also, an ON/OFF repetition frequency of the first switching means and the second switching means is set to be higher than a resonant frequency of the second resonant circuit, and to be such a frequency near the resonant frequency of the second resonant circuit.

Also, a relationship between the resonant frequency "f1" of the first resonant circuit and the resonant frequency "f2" of the second resonant circuit is set to f1>f2.

Also, the load circuit is arranged by a discharge lamp, and a third capacitor connected in parallel to this discharge lamp.

Also, an NTC thermistor is connected in series to the first resonant circuit.

Also, the inverter apparatus is comprised of a frequency sweeping circuit operated in such a manner that the ON/OFF repetition frequency of the first switching means and the second switching means is set to a frequency separated from the resonant frequency of the second resonant circuit along a higher frequency direction when the commercial power supply is turned ON, and thereafter is gradually approximated to the resonant frequency of the second resonant circuit while time elapses.

Further, the inverter apparatus is further comprised of a frequency sweeping circuit operable in such a manner that the ON/OFF repetition frequency of the first switching means and the second switching means is set to a frequency separated from the resonant frequency of the second resonant circuit along a higher frequency direction when the commercial power supply is turned ON, and is shifted to a frequency near the resonant frequency of the second resonant circuit after a predetermined time has passed.

Also, the load circuit is arranged by parallel-connecting two sets of circuits each constructed of one discharge lamp and one capacitor connected in parallel to the one discharge lamp; and the load circuit is connected to the second resonant circuit via a coil constructed of two windings which commonly use a magnetic member.

The above and other objects and features of the present invention will be more apparent from the following description taken in conjunction with the accompanying drawings.

BRIEF DESCRIPTION OF THE DRAWINGS

FIGS. 5A to 5E are operation waveform diagrams for indicating voltages, currents, and drive signals in various circuit portions of the inverter apparatus shown in FIG. 4;

DETAILED DESCRIPTION OF THE PREFERRED EMBODIMENTS

Now, a description will be given in more detail of preferred embodiments of the invention with reference to the accompanying drawings.

(EMBODIMENT 1)

Figure 1:
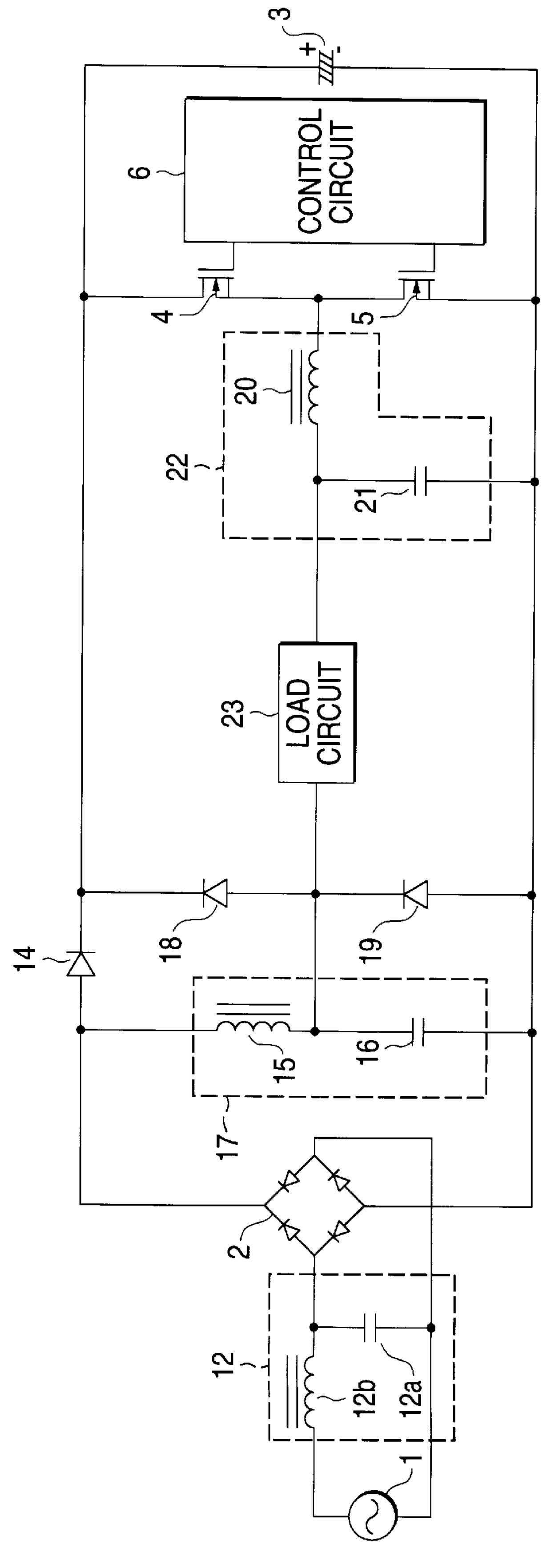
FIG. 1 is a circuit diagram of an inverter apparatus according to an embodiment 1 of the present invention.

FIG. 1 is a circuit diagram of an inverter apparatus according to an embodiment 1 of the present invention. FIGS. 2A to 2G show operation waveform diagrams of this circuit. It should be noted that the same reference numerals used in the prior art will be employed as those for denoting the same or similar circuit elements in the drawings.

In FIG. 1, a filter circuit 12 arranged by a capacitor 12*a* and a coil 12*b* is inserted to an input terminal of a power supply 1; a diode 14 is interposed between a rectifying circuit 2 and a smoothing capacitor 3; and a first resonant circuit 17 arranged by a coil 15 and a capacitor 16 is connected in parallel to the rectifying circuit 2. A diode 18 is connected between the smoothing capacitor 3 and a connection point of a coil 15 and a capacitor 16 of the first resonant circuit 17; a diode 19 is connected in parallel to the capacitor 16; a second resonant circuit 22 arranged by a coil 20 and a capacitor 21 is connected to a connection point between the transistors 4 and 5; and also a load circuit 23 is connected between the first resonant circuit 17 and the second resonant circuit 22.

It should be noted that the coil 15 indicates a first coil; the capacitor 16 represents a first capacitor; the coil 20 denotes a second coil; the capacitor 21 shows a second capacitor; the diode 14 represents a first diode; the diode 18 shows a second diode; and the diode 19 represents a third diode.

Figure 2A:
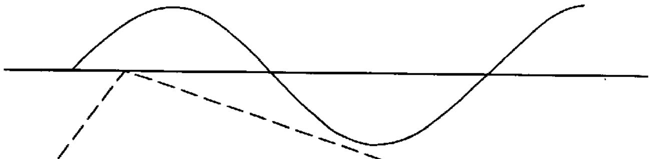
FIGS. 2A to 2G are operation waveform diagrams for representing voltages, currents, and drive signals at various circuit portions of the inverter apparatus shown in FIG. 1.
Figure 2B:
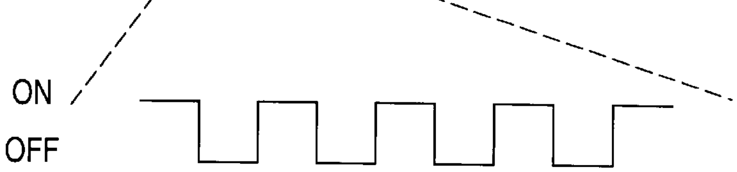
Figure 2C:
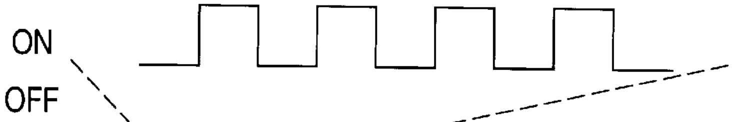
Figure 2D:
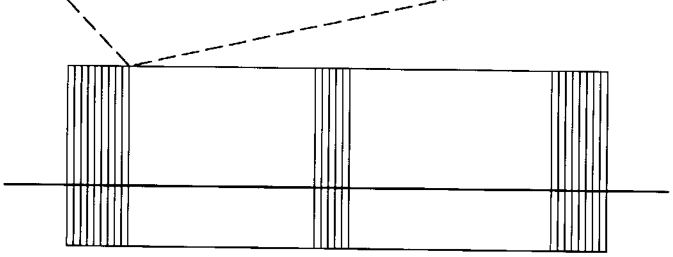
Figure 2E:
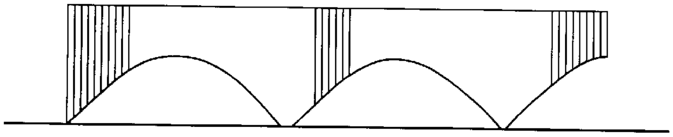
Figure 2F:
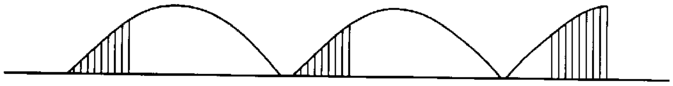
Figure 2G:
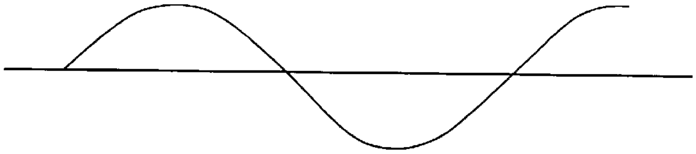

In FIGS. 2A to 2G, FIG. 2A represents a waveform of an input voltage supplied from the commercial power supply 1; FIG. 2B shows an ON/OFF waveform of the transistor 4 corresponding to the first switching means; FIG. 2C indicates an ON/OFF waveform of the transistor 5 corresponding to the second switching means; FIG. 2D shows a voltage waveform of the capacitor 21 for constituting the second resonant circuit; FIG. 2E represents a waveform of an output voltage of the rectifying circuit 2; FIG. 2F indicates a waveform of an output current of the rectifying circuit 2; and FIG. 2G denotes a waveform of an input current supplied from the commercial power supply 1.

In the above-described FIGS. 2A to 2G, an abscissa direction indicates time, and FIGS. 2B and 2C represent time in an enlarged form, as compared with those of other figures.

Next, operations will now be described.

The voltage of the commercial power supply 1 shown in FIG. 2A is rectified by the rectifying circuit 2, and charges the smoothing capacitor 3 via the diode 14. Then, the ON/OFF operations of the transistor 4 and the transistor 5 are alternately repeated in response to the drive signal of the control circuit 6 so as to produce the high frequency voltage at the connection point between the transistor 4 and the transistor 5. This high frequency voltage is applied to the second resonant circuit 22.

At this time, since the frequency of the high frequency voltage, namely the ON/OFF repetition frequency of the transistors 4 and 5 are set to such a high frequency near the resonant frequency "f2" of the second resonant circuit 22, such a high voltage as indicated in FIG. 2D is produced due to the resonant effect across the both ends of the capacitor 21 for constituting the second resonant circuit 22. The AC output of the high-frequency high voltage is supplied to the load circuit 23 and the first resonant circuit 17. As a result, the high frequency AC power is supplied to the load circuit 23.

On the other, the AC voltage applied via the load circuit 23 to the first resonant circuit 17 will charge/discharge the capacitor 16 of the first resonant circuit 17 under high frequency. At this time, the voltage produced at the capacitor 16 is clamped by the diode 19 in such a manner that only the positive voltage is clamped. Since the resonant frequency "f1" of the first resonant circuit 17 is set to be higher than the resonant frequency "f2" of the second resonant circuit 22, there is no strong resonant effect. The high frequency current may flow through the coil 15 in synchronism with the charging/discharging operations of the capacitor 16. The high frequency current flowing through the coil 15 causes the high frequency voltage to be produced at the coil 15. This high frequency voltage is superimposed on the output voltage of the rectifier circuit 2, as indicated in FIG. 2E.

FIG. 2F represents the waveform of the current flowing from the rectifying circuit 2 to the coil 15. The high frequency current corresponding to the voltage of the commercial power supply 1 may flow in this manner. The high frequency components of this high frequency current is removed by the filter circuit 12, so that the resultant current indicates the envelope waveform (shown in FIG. 2G) of the waveform inputted from the commercial power supply 1. The current contains no high frequency component, which becomes analogous to the voltage waveform of the commercial power supply 1. The back electromotive force produced from the coil 15 may charge the smoothing capacitor 3 via the diode 18. As a result, the boosted DC voltage is charged at the smoothing capacitor 3.

As described above, since the distortion of the input current of the power supply can be reduced, it is possible to provide an inverter apparatus such that the power factor is high and the production of the high frequency is lowered.

It should be understood that since the relatively high voltage produced from the second resonant circuit 22 is applied to the load circuit 23, either when a low voltage is required or when a voltage higher than this low voltage is required, the power may be supplied via a transformer to the load of the load circuit 23.

Also, in this embodiment 1, the voltage is boosted by the back electromotive force by way of the coil 15 to thereby charge the smoothing capacitor 3. Alternatively, even when the switching frequency of the transistors 4 and 5 is set to such a frequency capable of suppressing the boosted voltage corresponding to the load current, a similar effect may be achieved.

It should also be noted that since the method for setting the resonant frequency in the first resonant circuit 17 and the second resonant circuit 22, namely the method for setting the constants of the coil and the capacitor so as to set the resonant frequency is well known in the art, explanations thereof are omitted.

(EMBODIMENT 2)

Figure 3:
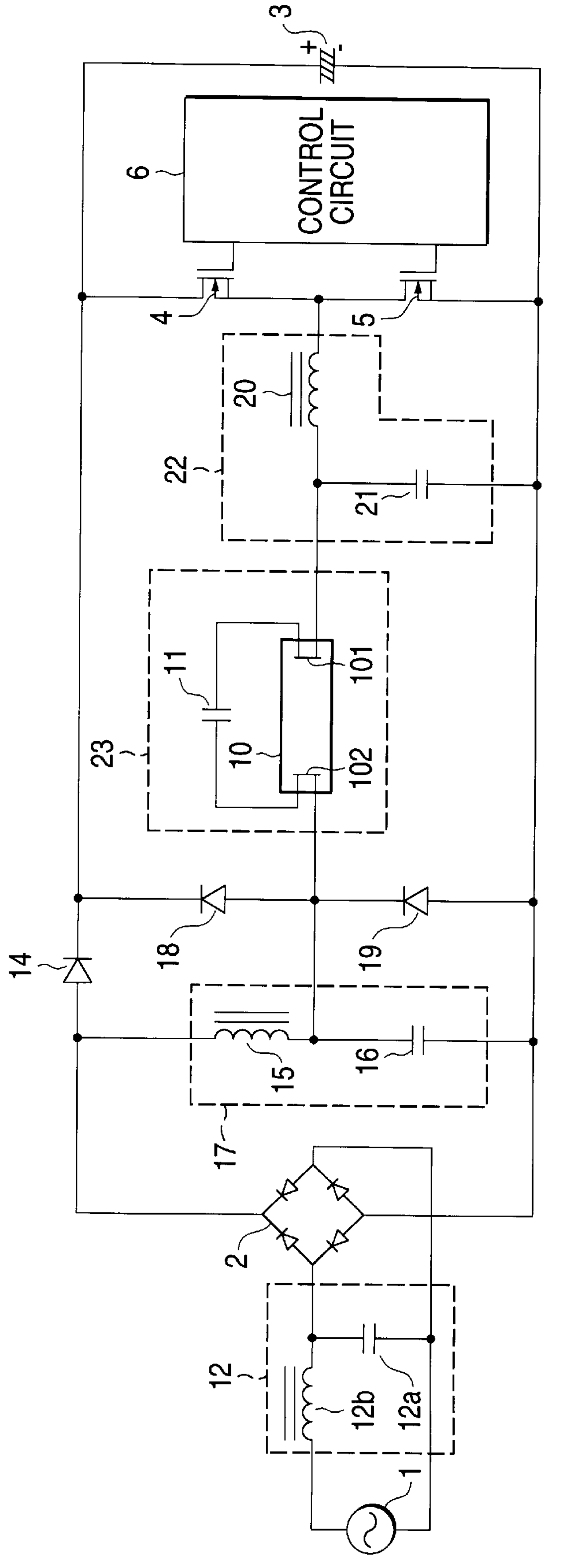
FIG. 3 is a circuit diagram of an inverter apparatus according to an embodiment 2 of the present invention.

FIG. 3 indicates a circuit diagram of an inverter apparatus according to an embodiment 2 of this invention. It should be noted that the same reference numerals used in the embodiment 1 will be employed as those for indicating the same or similar circuit elements of the embodiment 2.

A load circuit 23 is constituted by a parallel circuit of a discharge lamp 10 and a capacitor 11, and filaments 101 and 102 are built in both ends of the discharge lamp 10.

The discharge lamp 10 is constructed of, for instance, a low-pressure mercury vapor discharge lamp such as a fluorescent lamp, which may convert ultraviolet energy produced by discharge operation into visible light.

A capacitor 11 indicates a third capacitor.

Now, operations will be explained.

Similar to the embodiment 1, the transistor 4 and the transistor 5 are repeatedly turned ON/OFF, and thus a high frequency/high voltage AC output is produced from the second resonant circuit 22. At this time, since a relationship between a capacitance value C2 of a capacitor 21 and a capacitance value C3 of a capacitor 20 is set to be equal to C2>C3, the resonant frequency of the second resonant circuit 22 is mainly determined by the capacitor 21, and the resonant current is shunted based on the capacitance ratio. The current flowing on the side of the discharge lamp 10 heats the filaments 101 and 102 contained in the discharge lamp 10.

Also, this AC output voltage is subdivided to the capacitor 11 and the capacitor 16, and the voltage produced across the capacitor 11 is applied to the discharge lamp 10. Thereafter, when the filaments 101 and 102 contained in the discharge lamp 10 is sufficiently heated and are brought into the dischargeable condition, the discharge lamp 10 starts its discharge operation by the voltage across the capacitor 11. When the discharge lamp 10 starts its discharge operation, since the discharge lamp 10 is equivalent to the resistance load, the high frequency current may flow through the rectifying circuit 2 in correspondence with the commercial power supply 1 similar to the embodiment 1, and the high frequency components are removed by the filter circuit 11, so that the waveform of the power supply current is analogous to the voltage waveform of the commercial power supply 1.

As described above, in the case that the discharge lamp constitutes the load, the high voltage producing circuit used to ignite the discharge lamp can be readily arranged. Since the distortion of the power supply input current can be reduced when the discharge lamp is ignited, it is possible to provide the inverter apparatus (discharge lamp igniting apparatus) having the high power factor and less occurrences of the harmonic waves.

(EMBODIMENT 3)

Figure 4:
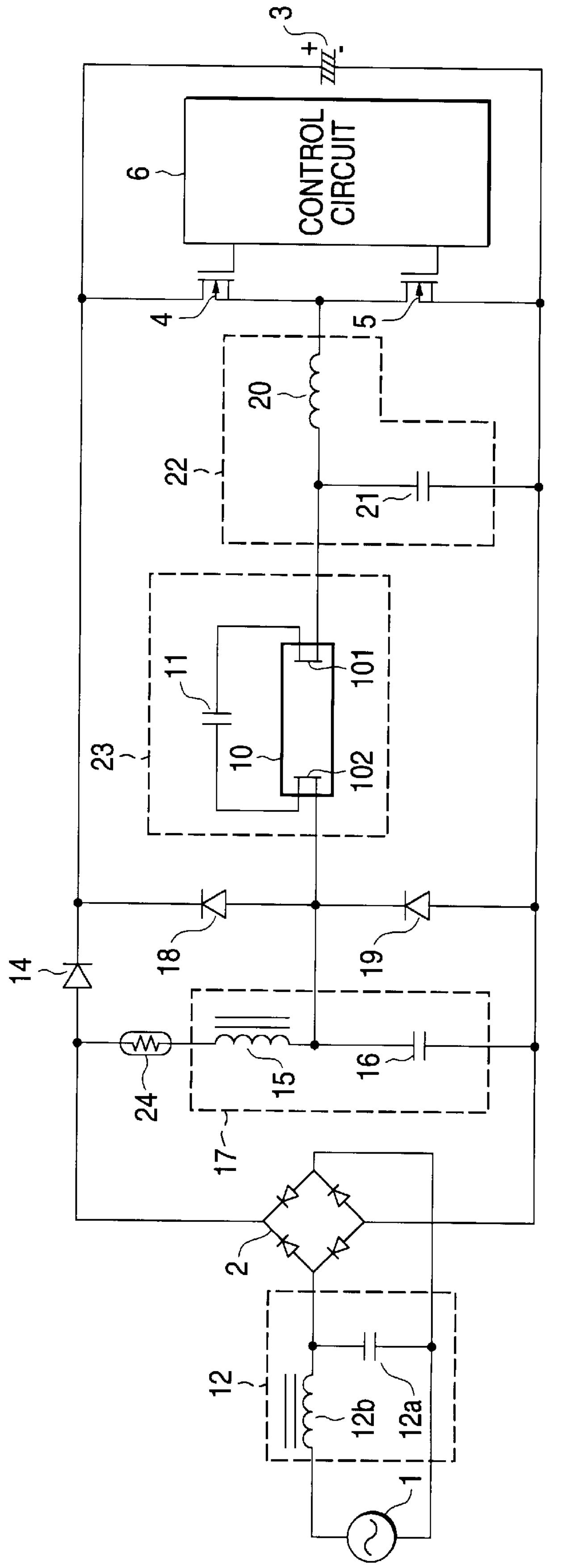
FIG. 4 is a circuit diagram of an inverter apparatus according to an embodiment 3 of the present invention.

FIG. 4 is a circuit diagram of an inverter apparatus according to an embodiment 3 of the present invention. FIGS. 5A to 5E show operation waveform charts of this circuit. It should be noted that the same reference numerals used in the embodiments 1 and 2 will be employed as those for denoting the same, or similar circuit elements in this embodiment.

In FIG. 4, reference numeral 24 is a thermistor corresponding to an element having such a characteristic that when a current flows through this element, a resistance value thereof is lowered due to a self-heating effect. The NTC thermistor 24 is interposed between the first resonant circuit 17 and the rectifying circuit 2.

In FIGS. 5A to 5E, FIG. 5A shows an ON/OFF waveform of the commercial power supply 1; FIG. 5B represents a voltage waveform of the smoothing capacitor 3; FIG. 5C indicates an ON/OFF waveform of the transistor 4; FIG. 5D denotes an ON/OFF waveform of the transistor 5; and FIG. 5E shows a voltage waveform of the discharge lamp 10.

It should be noted that in FIGS. 5A to 5E, an abscissa direction indicates time, and in FIGS. 5C and 5D, the time widths are enlarged, as compared with those of other drawings.

Next, operation will now be explained.

As indicated in FIG. 5A, when the commercial power supply 1 is turned ON at certain timing, a voltage across the smoothing capacitor 3 is rapidly increased in a time period "t1" shown in FIG. 5B. This is because the voltage of the commercial power supply 1 is rectified by the rectifying circuit 2, and the smoothing capacitor 3 is charged by this rectified voltage via the diode 14.

Thereafter, as indicated in FIG. 5C and FIG. 5D, when the transistor 4 and the transistor 5 are alternately turned ON/OFF, the AC voltage produced from the second resonant circuit 22 is applied to the load circuit 23 and the first resonant circuit 17, and the high frequency current flows through the coil 15 for constituting the first resonant circuit in a similar manner to the embodiment 1.

The NTC thermistor 24 represents the high resistance value before the high frequency current flows therethrough, namely the commercial power supply 1 is not turned ON, but this high resistance value is reduced due to the self-heating effect when the high frequency current starts to flow. Accordingly, since the high frequency current flowing through the coil 15 is gradually increased and the back electromotive force produced at the coil 15, namely the boosting effect is increased in proportional to the high frequency current flowing through the coil 15, the smoothing capacitor 3 is charged via the diode 18 in such a manner that the voltage across this smoothing capacitor 3 is gradually increased during a time period "t2" shown in FIG. 5B.

On the other hand, since the voltage applied to the discharge lamp 10 is in proportional to the charging voltage of the smoothing capacitor 3, this voltage is increased while following to the voltage of the smoothing capacitor 3, as indicated in FIG. 5E, and the discharge operation is commenced at a time instant shown by a symbol "A". During a time period defined after the commercial power supply 1 is turned ON until the discharge lamp 10 discharges, namely a time period "t3" indicated in FIG. 5E, since the AC voltage produced from the second resonant circuit 22 flows through the capacitor 11 and the capacitor 16, the filaments 101 and 102 contained in the discharge lamp 10 are sufficiently heated, and thereafter the discharge lamp 10 can be brought into the discharge condition. Similar to the embodiment 1, when the discharge lamp 10 is turned ON, the current waveform derived from the commercial power supply 1 is analogous to the voltage waveform.

As described above, since the distortion of the power supply input current can be reduced during the turn-ON operation, the power factor is high and the occurrence of the harmonic waves is lowered. Furthermore, the filaments are sufficiently heated before the discharge lamp is ignited. As a consequence, it is possible to provide such an inverter apparatus (discharge lamp igniting apparatus) capable of suppressing the consumption of the filaments, and of making the long lifetime of the discharge lamp.

(EMBODIMENT 4)

Figure 6:
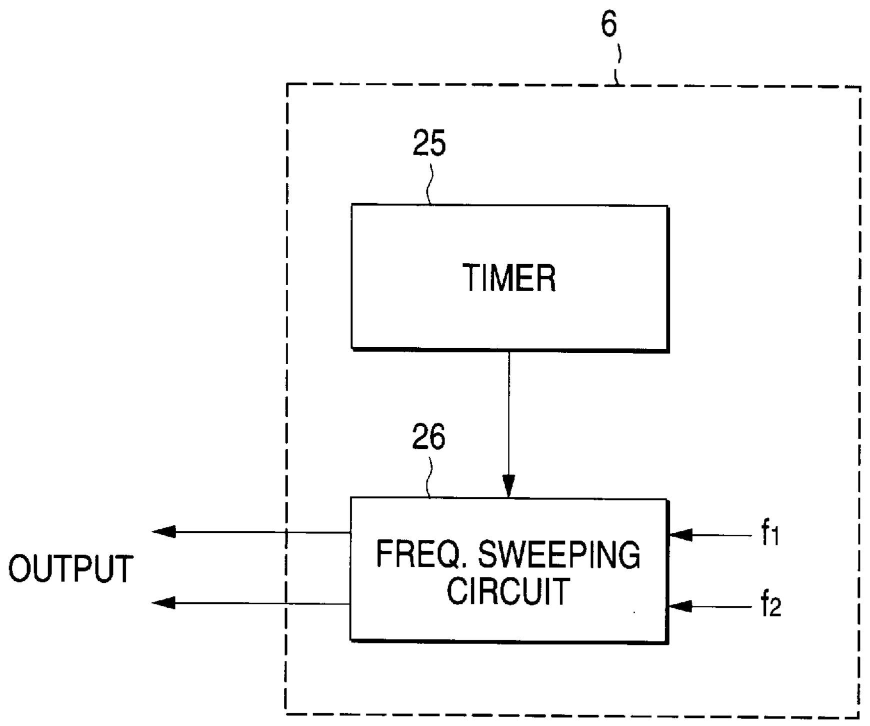
FIG. 6 is a block diagram of a control circuit of an inverter apparatus according to an embodiment 4 of the present invention.

FIG. 6 is a block diagram for showing a control circuit 6 of a circuit of an inverter apparatus according to an embodiment 4 of the present invention. An overall circuit diagram is the same as that of the embodiment 2 shown in FIG. 3. FIGS. 7A to 7D indicate operation waveform diagrams of this circuit.

In FIG. 6, reference numeral 25 shows a timer, and reference numeral 26 indicates a frequency sweeping circuit. When the commercial power supply 1 is turned ON, the timer 25 is operated. While the timer 25 is operated, the frequency sweeping circuit 26 sweeps the frequency from "f1" to "f2".

The frequency "f1" is set to such a frequency higher than the resonant frequency "f0" of the second resonant circuit 22 by a preselected frequency value, whereas the frequency "f2" is set to be approximated to the resonant frequency "f0" of the second resonant frequency 22.

Figure 7A:
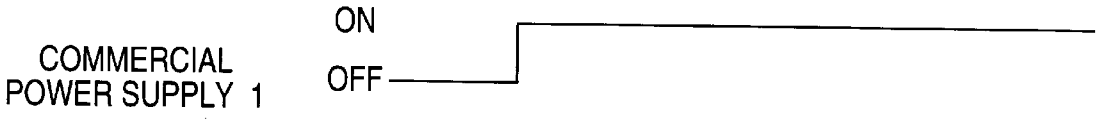
FIGS. 7A to 7D are operation waveform diagrams for indicating voltages, currents, and drive signals in various circuit portions of the inverter apparatus shown in FIG. 6.
Figure 7B:
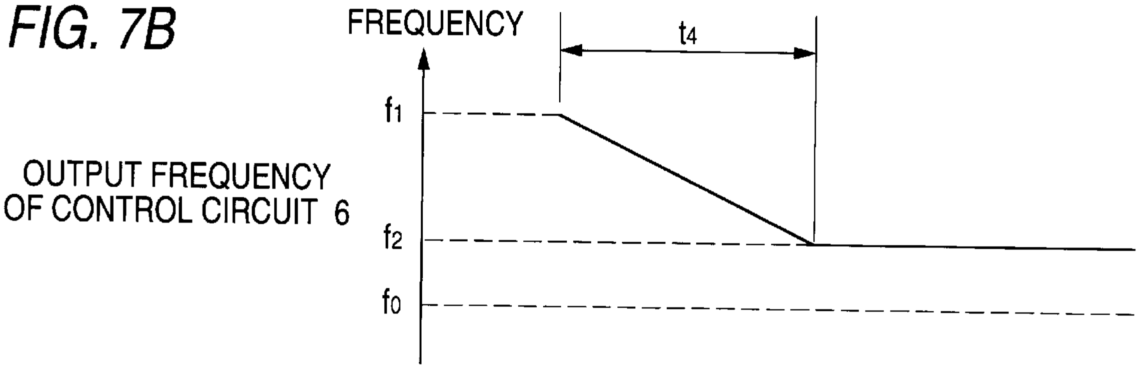
Figure 7C:
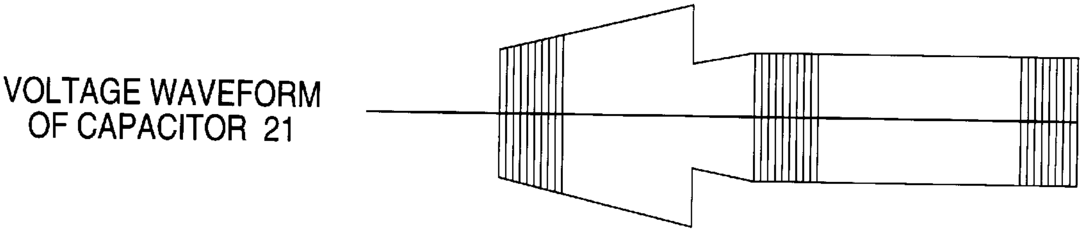

In FIGS. 7A to 7D, FIG. 7A indicates an ON/OFF waveform of the commercial power supply 1; FIG. 7B represents a timing chart for indicating a transition of an output frequency of the control circuit 6; FIG. 7C shows a voltage waveform of the capacitor 21 employed in the second resonant circuit 22; and FIG. 7D denotes a waveform of a voltage applied to the discharge lamp 10. It should be noted that time "t4" indicated in FIG. 7B corresponds to time set to the timer 25, approximately 1 second.

Next, operations will now be described.

As indicated in FIG. 7A, when the commercial power supply 1 is turned ON at certain timing, the timer 25 provided in the control circuit 6 is operated, so that the frequency sweeping operation of the frequency sweeping circuit 26 is commenced. As represented in FIG. 7B, the frequency sweeping circuit 26 outputs to the transistors 4 and 5, such an output that the frequency is swept from the frequency "f1" to the frequency "f2" within a time period "t4".

As indicated in FIG. 7C, the voltage across the capacitor 21 is gradually increased during this time period. This is because the operation frequency is approximated to the resonant frequency "f0" of the second resonant circuit 22, so that the resonant effect is gradually increased. The voltage across the capacitor 21 is applied to the capacitor 16 and the load circuit 23 constituted of the parallel circuit of the discharge lamp 10 and the capacitor 11, and thus, the current may flow via the capacitor 11 to the filaments 101 and 102 contained in the discharge lamp 10 so as to heat these filaments 101 and 102.

Figure 7D:
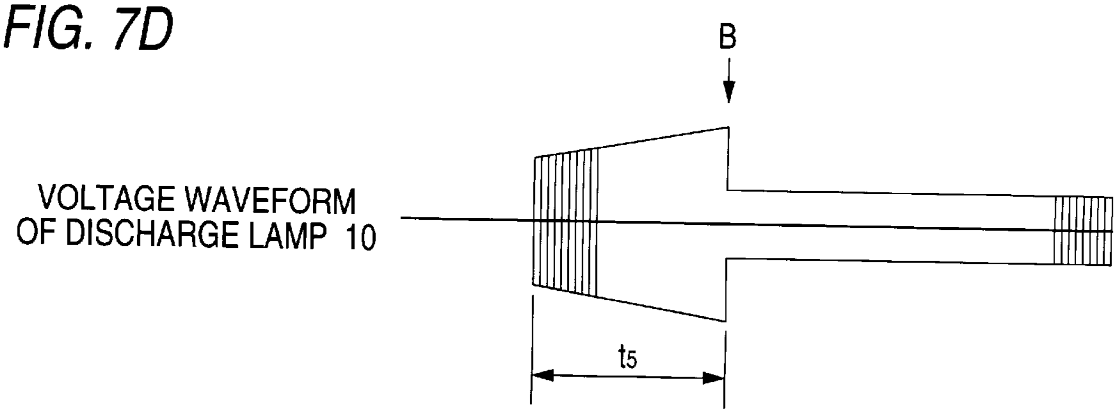

Then, when the voltage applied to the discharge lamp 10 is increased and reaches the voltage value at which the discharge lamp can be turned ON, the discharge operation of the discharge lamp 10 is commenced at a time instant (timing) shown in a point "B". In other words, as represented in FIG. 7D, the filaments 101 and 102 of the discharge lamp 10 are heated during a time period "t5" defined after the commercial power supply 1 is turned ON until the point B where the discharge operation of the discharge lamp 10 is commenced. Similar to the embodiment 1, if the discharge lamp 10 is turned ON, then the waveform of the current supplied from the commercial power supply 1 is analogous to the waveform of the voltage.

As described above, since the distortion of the power supply input current can be reduced during the turn-ON operation, the power factor is high and the occurrence of the harmonic waves is lowered. Furthermore, the filaments are sufficiently heated before the discharge lamp is ignited. As a consequence, it is possible to provide such an inverter apparatus (discharge lamp igniting apparatus) capable of suppressing the consumption of the filaments, and of making the long lifetime of the discharge lamp.

(EMBODIMENT 5)

Figure 8:
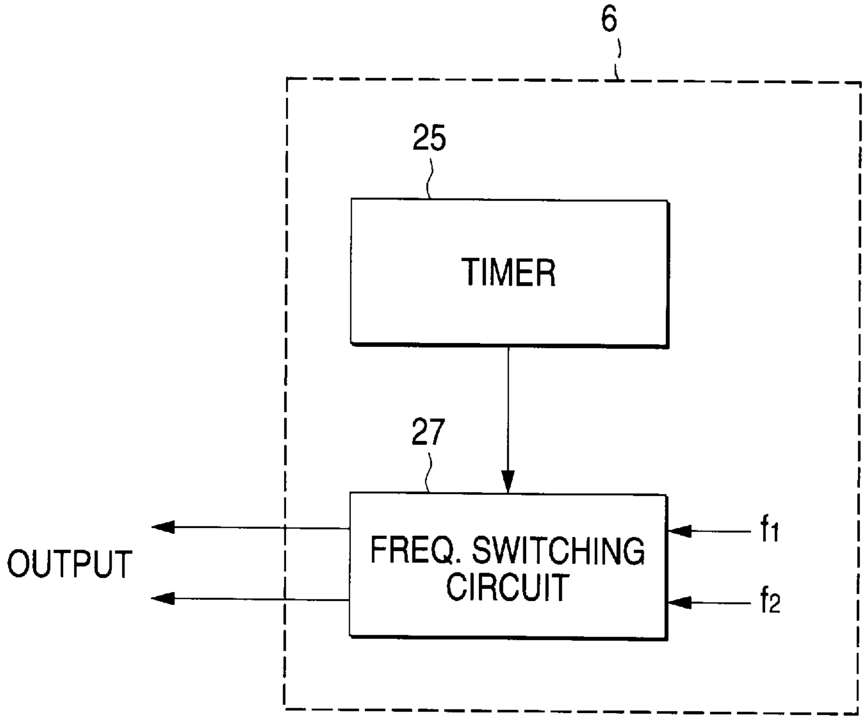
FIG. 8 is a block diagram of a control circuit of an inverter apparatus according to an embodiment 5 of the present invention.

FIG. 8 is a block diagram for showing a control circuit 6 of a circuit of an inverter apparatus according to an embodiment 5 of the present invention. An overall circuit diagram is the same as that of the embodiment 2 shown in FIG. 3. FIGS. 9A to 9D indicate operation waveform diagrams of this circuit.

In FIG. 8, reference numeral 25 shows a timer, and reference numeral 27 indicates a frequency switching circuit. When the commercial power supply 1 is turned ON, the timer 25 is operated. When the operation of the timer 25 is started, the frequency switching circuit 27 outputs a frequency "f1". When the timer 25 counts up predetermined time, the frequency switching circuit 27 switches the frequency from the frequency "f1" to the frequency "f2".

The frequency "f1" is set to such a frequency higher than the resonant frequency "f0" of the second resonant circuit 22 by a preselected frequency value, whereas the frequency "f2" is set to be approximated to the resonant frequency "f0" of the second resonant frequency 22.

Figure 9A:
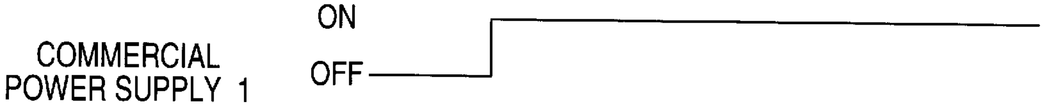
FIGS. 9A to 9D are operation waveform diagrams for indicating voltages, currents, and drive signals in various circuit portions of the inverter apparatus shown in FIG. 6.
Figure 9B:
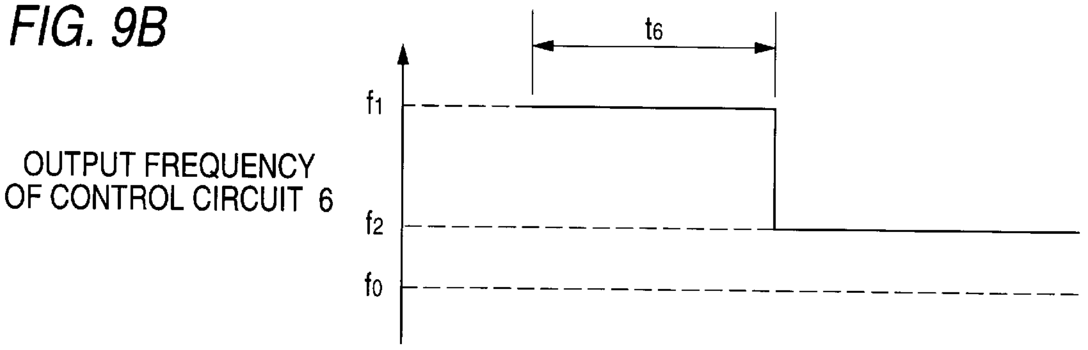
Figure 9C:
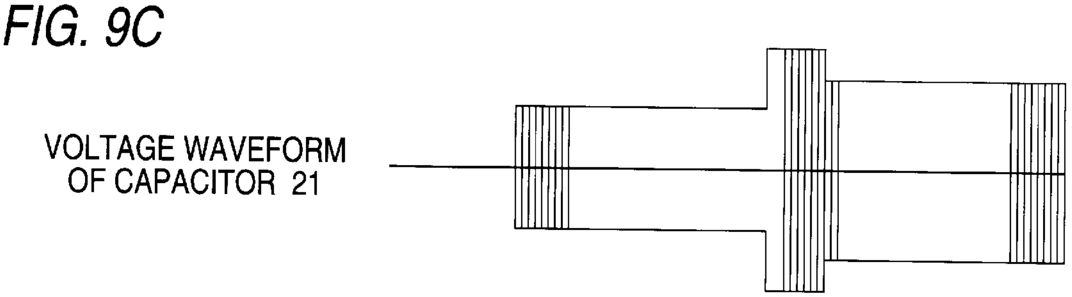

In FIGS. 9A to 9D, FIG. 9A indicates an ON/OFF waveform of the commercial power supply 1; FIG. 9B represents a timing chart for indicating a transition of an output frequency of the control circuit 6; FIG. 9C shows a voltage waveform of the capacitor 21 employed in the second resonant circuit 22; and FIG. 9D denotes a waveform of a voltage applied to the discharge lamp 10. It should be noted that time "t6" indicated in FIG. 9B corresponds to time set to the timer 25, approximately 1 second.

Next, operations will now be described.

As indicated in FIG. 9A, when the commercial power supply 1 is turned ON at certain timing, the timer 25 provided in the control circuit 6 starts to be operated, so that the frequency switching circuit 27 outputs a frequency "f1". Thereafter, as indicated in FIG. 9B, when the timer 25 has measured a predetermined time "t6", the frequency switching circuit 27 switches its output frequency from the frequency "f1" to a frequency "f2" and outputs the switched frequency signal to the transistors 4 and 5.

During this time period, the voltage across the capacitor 21 becomes a constant voltage, as indicated in FIG. 9C. Then, after a time "t6" has passed, the output voltage is increased. This is because the operation frequency is approximated to the resonant frequency "f0" of the second resonant circuit 22, so that the resonant effect is gradually increased. The voltage across the capacitor 21 is applied to the capacitor 16 and the load circuit 23 constituted by the parallel circuit of the discharge lamp 10 and the capacitor 11, and thus, the current may flow via the capacitor 11 to the filaments 101 and 102 contained in the discharge lamp 10 so as to heat these filaments 101 and 102.

Figure 9D:
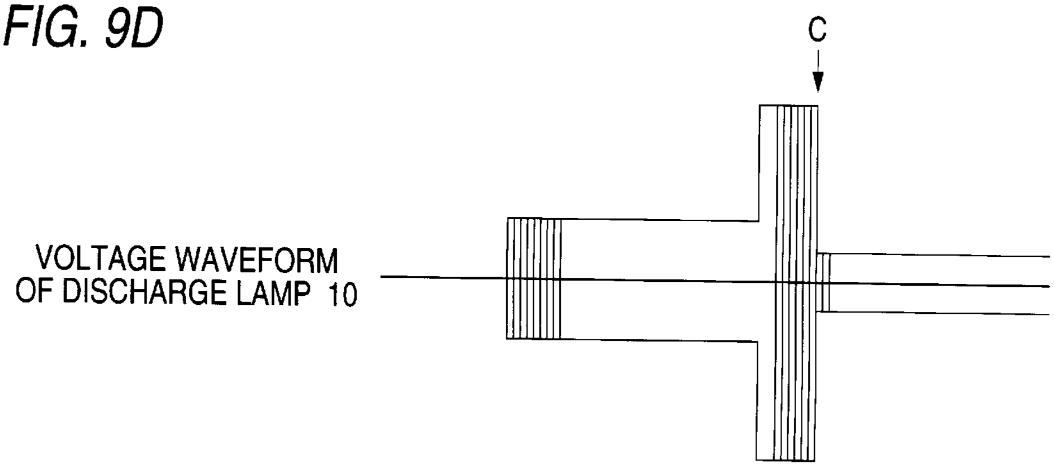

Then, when the voltage applied to the discharge lamp 10 is increased and reaches the voltage value at which the discharge lamp can be turned ON, the discharge operation of the discharge lamp 10 is commenced at a time instant (timing) shown in a point "C". In other words, as represented in FIG. 9D, the filaments 101 and 102 of the discharge lamp 10 are heated during a time period "t6" defined after the commercial power supply 1 is turned ON until the point C where the discharge operation of the discharge lamp 10 is commenced. Similar to the embodiment 1, if the discharge lamp 10 is turned ON, then the waveform of the current supplied from the commercial power supply 1 is analogous to the waveform of the voltage.

As described above, since the distortion of the power supply input current can be reduced during the turn-ON operation, the power factor is high and the occurrence of the harmonic waves is lowered. Furthermore, the filaments are sufficiently heated before the discharge lamp is ignited. As a consequence, it is possible to provide such an inverter apparatus (discharge lamp igniting apparatus) capable of suppressing the consumption of the filaments, and of making the long lifetime of the discharge lamp.

(EMBODIMENT 6)

Figure 10:
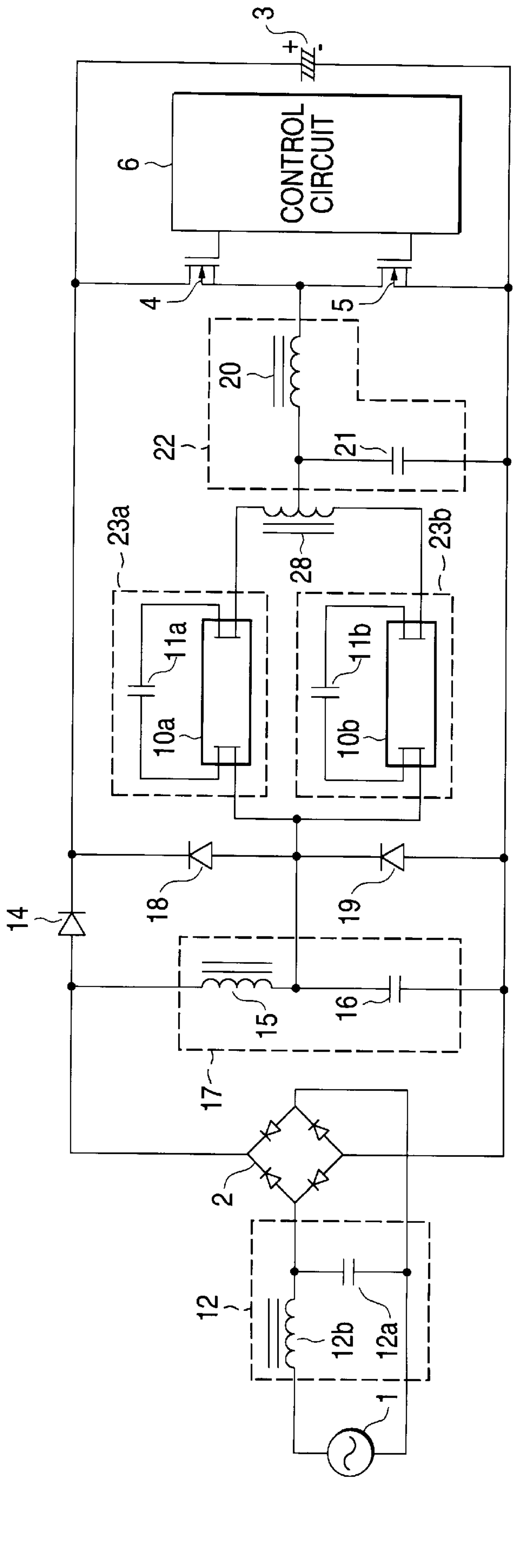
FIG. 10 is a circuit diagram of an inverter apparatus according to an embodiment 6 of the present invention.
Figure 11:
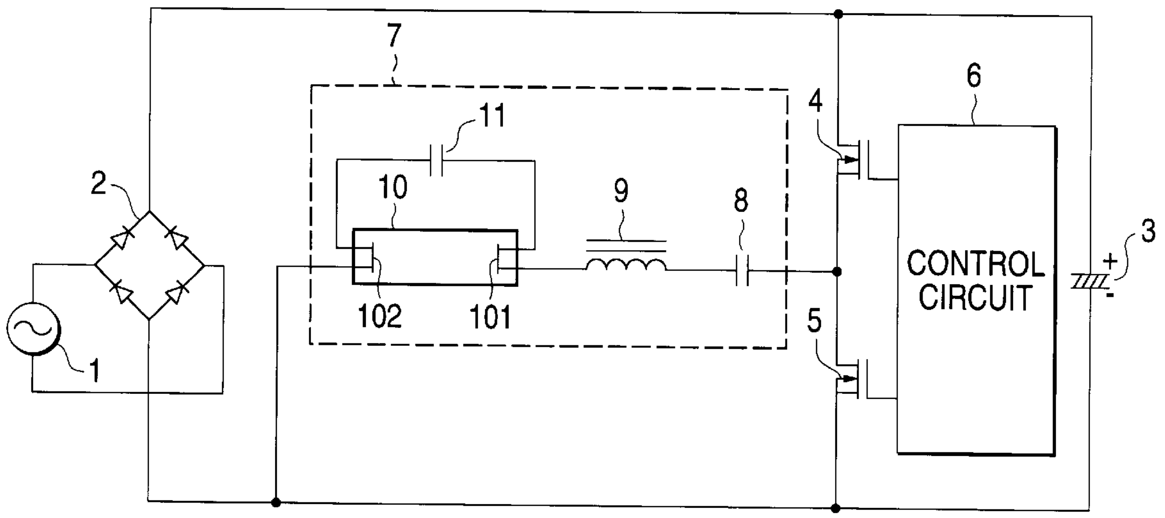
FIG. 11 is the circuit diagram of the conventional inverter apparatus.
Figure 12A:
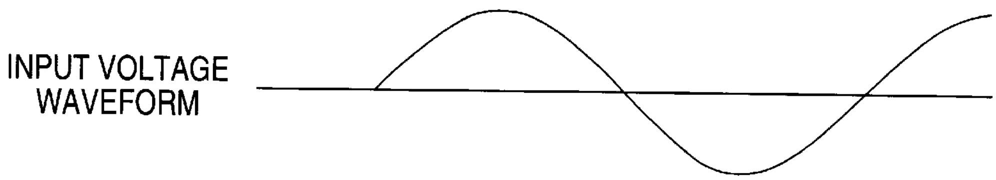
FIGS. 12A and 12B are operation waveform diagrams for representing voltages, currents, and drive signals at various circuit portions of the conventional inverter.
Figure 12B:

FIG. 10 indicates a circuit diagram of an inverter apparatus according to an embodiment 6 of the present invention. It should be noted that the same reference numerals used in the embodiment 2 will be employed as those for denoting the same, or similar circuit elements of this embodiment 6, and explanations thereof are omitted. Reference numeral 23*a* shows a first load circuit which is arranged by a discharge lamp 10*a* and a capacitor 11*a* parallel-connected to this discharge lamp 10*a*.

Similarly, reference numeral 23*b* indicates a second load circuit which is arranged by a discharge lamp 10*b* and a capacitor 11*b* parallel-connected to this discharge lamp 10*b*. Reference numeral 28 denotes a coil made of two windings, which commonly use a magnetic member. When currents flow through the two coil windings along the same direction, this coil is operable to mutually cancel the magnetic flux.

Next, operations will now be described.

Similar to the embodiment 2, the transistor 4 and the transistor 5 are alternately and repeatedly turned ON/OFF, and thus a high frequency/high voltage AC output is produced from the second resonant circuit 22. The voltage produced across the capacitor 21 is applied via the coil 28 to the first load circuit 23*a* and the second load circuit 23*b*.

In such a case that a current flowing through the first load circuit 23*a* is the same as a current flowing through the second load circuit 23*b*, the inductance component of the coil 28 becomes zero. Thus, similar to the embodiment 2, the AC voltage produced across the capacitor 21 is outputted via both the first and second load circuits to the capacitor 16. When the discharge lamp 10*a* and the discharge lamp 10*b* are turned ON, these discharge lamps become equivalent to the resistive load. As a result, similar to the embodiment 1, a high frequency current may flow through the rectifying circuit 2 in correspondence with the commercial power supply 1, and a high frequency component is removed by the filter circuit 12, so that the waveform of the power supply current is analogous to the voltage waveform of the commercial power supply 1.

As described above, when two sets of the discharge lamps constitute the load, the high voltage producing circuit for igniting these discharge lamps can be easily constructed. Since the distortion of the power supply input current can be reduced when the discharge lamps are turned ON, it is possible to provide such an inverter apparatus (discharge lamp igniting apparatus) with the high power factor and the low production of the harmonic waves.

Since the present invention has been arranged, as explained above, the following effects can be achieved.

After the DC voltage outputted from the rectifying circuit has been smoothed by the smoothing capacitor, the first switching means are turned ON/OFF so as to convert the smoothed DC voltage into the high frequency power. Then, this high frequency power is supplied via the second resonant circuit to the load circuit and the first resonant circuit, and the high frequency voltage is superimposed on the output derived from the rectifying circuit from the first resonant circuit. As a result, the high frequency current may flow through the rectifying circuit in correspondence with the voltage of the commercial power supply, and the waveform of the input current is analogous to the waveform of the input voltage. As a consequence, it is possible to provide the inverter apparatus with the high power factor, and operable in the high efficiency, in which the occurrence of the power supply harmonic waves is reduced.

Also, since the ON/OFF repetition frequency of the first switching means and the second switching means is set to be higher than the resonant frequency of the second resonant circuit, and to be such a frequency near the resonant frequency of the second resonant circuit, the high frequency voltage superimposed to the output of the rectifying circuit can be increased. Moreover, since the waveform of the input current is analogous to the waveform of the input voltage, it is possible to obtain such an inverter apparatus with the high power factor and operable in the high efficiency, in which the occurrence of the power supply harmonic waves is reduced.

Furthermore, since the relationship between the resonant frequency "f1" of the first resonant circuit and the resonant frequency "f2" of the second resonant circuit is set to f1>f2, the high frequency voltage having the proper amplitude is produced which is superimposed to the output of the rectifying circuit. Moreover, since the waveform of the input current is analogous to the waveform of the input voltage, it is possible to obtain such an inverter apparatus with the high power factor and operable in the high efficiency, in which the occurrence of the power supply harmonic waves is reduced.

Also, since the load circuit is arranged by the discharge lamp, and the third capacitor connected in parallel to this discharge lamp, when the discharge lamp constitutes the load, the current for heating the filaments contained in the discharge lamp may flow by using the capacitor connected in parallel to the discharge lamp. As a result, the discharge lamp can be turned ON by way of a simple circuit, so that it is possible to obtain the inverter apparatus operable in the high efficiency, in which the occurrence of the power supply harmonic waves is reduced.

Also, when the load is constructed of the discharge lamp, since the NAT thermistor is connected in series with the fist resonant circuit, the current is caused to flow through the filament of the discharge lamp before the discharge operation of the discharge lamp is commenced, so that the filament is sufficiently and properly heated. As a consequence, the long lifetime of the discharge lamp can be maintained, and furthermore, it is possible to obtain the inverter apparatus operable in the high efficiency, in which the occurrence of the power supply harmonic waves is reduced.

Also, when the load is construct of the discharge lamp, the frequency sweeping circuit is operated in such a manner that the ON/OFF repetition frequency of the first switching means and the second switching means is set to the frequency separated from the resonant frequency of the second resonant circuit along the higher frequency direction when the commercial power supply is turned ON, and thereafter is gradually approximated to the resonant frequency of the second resonant circuit while time elapses. The operation time is delayed after the power supply is turned ON until the discharge lamp is ignited, during which the filament of the discharge lamp can be sufficiently heated. Then, the filament is properly heated before the discharge lamp is turned ON. As a consequence, the long lifetime of the discharge lamp can be maintained, and furthermore, it is possible to obtain the inverter apparatus operable in the high efficiency, in which the occurrence of the power supply harmonic waves is reduced.

Also, when the load is constructed of the discharge lamp, the frequency switching circuit is operated in such a manner that the ON/OFF repetition frequency of the first switching means and the second switching means is set to the frequency separated from the resonant frequency of the second resonant circuit along the higher frequency direction when the commercial power supply is turned ON, and is shifted to the frequency near the resonant frequency of the second resonant circuit after a predetermined time has passed. The operation time is delayed after the power supply is turned ON until the discharge lamp is ignited, during which the filament of the discharge lamp can be sufficiently heated. Then, the filament is properly heated before the discharge lamp is turned ON. As a consequence, the long lifetime of the discharge lamp can be maintained, and furthermore, it is possible to obtain the inverter apparatus operable in the high efficiency, in which the occurrence of the power supply harmonic waves is reduced.

Also, the load circuit is arranged by parallel-connecting two sets of circuit each constructed of one discharge lamp and one capacitor connected in parallel to the one discharge lamp; and the load circuit is connected to the second resonant circuit via the coil constructed of two windings which commonly use the magnetic member. Since the high frequency power is supplied from the second resonant circuit via the coil to the load circuit, even when two sets of the discharge lamps are turned ON in the parallel mode, the harmonic waves of the power supply can be reduced, and the igniting apparatus capable of igniting two sets of the discharge lamps can be simply arranged. Moreover, it is possible to obtain the inverter apparatus operable in the high efficiency, in which the occurrence of the power supply if harmonic waves is reduced.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An inverter apparatus, comprising:

a rectifying circuit for rectifying a commercial power supply in a full-waveform mode;

a smoothing capacitor for smoothing an output of this rectifying circuit;

a switching unit including first and second switching means which are provided between output terminals of said smoothing capacitor, connected in series to each other, and are alternatively turned ON/OFF;

a control circuit for turning ON/OFF said first and second switching means so as to convert a voltage of said smoothing capacitor into high frequency power, said high frequency power being supplied to a load;

a first resonant circuit constructed of a first coil and a first capacitor, and connected to an output of said rectifying circuit;

a first diode for separating said rectifying circuit from said smoothing capacitor;

a second diode connected in parallel to a series circuit constructed of said coil and said separating diode;

a third diode connected in parallel to said first capacitor;

a second resonant circuit constructed of a second coil and a second capacitor, and connected between said switching unit and a load circuit; and wherein the load circuit is also connected between said first resonant circuit and said second resonant circuit.

2. An inverter apparatus as claimed in claim 1 wherein:

an ON/OFF repetition frequency of said first switching means and said second switching means is set to be higher than a resonant frequency of said second resonant circuit, and to be such a frequency near said resonant frequency of said second resonant circuit.

3. An inverter apparatus as claimed in claim 1 wherein:

a relationship between the resonant frequency "f1" of said first resonant circuit and the resonant frequency "f2" of said second resonant circuit is set to f1>f2.

4. An inverter apparatus as claimed in claim 1 wherein:

said load circuit is arranged by a discharge lamp, and a third capacitor connected in parallel to this discharge lamp.

5. An inverter apparatus as claimed in claim 4 wherein:

an NTC thermistor is connected in series to said first resonant circuit.

6. An inverter apparatus as claimed in claim 1 wherein:

said inverter apparatus is comprised of a frequency sweeping circuit operated in such a manner that the ON/OFF repetition frequency of said first switching means and said second switching means is set to a frequency separated from the resonant frequency of said second resonant circuit along a higher frequency direction when the commercial power supply is turned ON, and thereafter is gradually approximated to the resonant frequency of said second resonant circuit while time elapses.

7. An inverter apparatus as claimed in claim 1, wherein:

said inverter apparatus is further comprised of a frequency sweeping circuit operable in such a manner that the ON/OFF repetition frequency of said first switching means and said second switching means is set to a frequency separated from the resonant frequency of said second resonant circuit along a higher frequency direction when the commercial power supply is turned ON, and is shifted to a frequency near the resonant frequency of said second resonant circuit after a predetermined time has passed.

8. An inverter apparatus as claimed in claim 1 wherein:

said load circuit is arranged by parallel-connecting two sets of circuits each constructed of one discharge lamp and one capacitor connected in parallel to said one discharge lamp; and said load circuit is connected to said second resonant circuit via a coil constructed of two windings which commonly use a magnetic member.

9. An inverter apparatus as claimed in claim 1 wherein:

one terminal of said second coil of said second resonant circuit is connected to a connection point located between said first and second switching means, and another terminal of said second coil is connected to said load circuit; and one terminal of said second capacitor of said second resonant circuit is connected to a connection point between said second coil and said load circuit, and another terminal of said second capacitor is connected to said smoothing capacitor.

10. An inverter apparatus as claimed in claim 1 wherein:

one terminal of said load circuit is connected to said second coil, and another terminal of said load circuit is connected to a connection point located between said first coil and said first capacitor.

11. An inverter apparatus as claimed in claim 1 wherein:

a connection point between said second and third diodes is directly connected to a connection point between said first coil and said first capacitor.

12. An inverter apparatus as claimed in claim 1 wherein:

said first resonant circuit is directly connected to output terminals of said rectifying circuit.

* * * * *